US005203063A

United States Patent [19]

Bonani et al.

[11] Patent Number: 5,203,063

[45] Date of Patent: Apr. 20, 1993

[54] DEVICE FOR MOUNTING AND DISMOUNTING SHAFT FURNACE TYMPS

[75] Inventors: Nicolas Bonani, Schifflange; Edmond Mainz, Bettembourg; Edouard Sand, Esch/Alzette; Ernest Sand, Dudelange; Nicolas Wintersdorf, Esch/Alzette; Michel Lux, Leudelange; Francis Gross, Esch/Alzette; Victor Hutmacher, Niedercorn; Patrick Peiffer, Rumelange; Pierre Mailliet, Howald, all of Luxembourg

[73] Assignee: Paul Wurth S.A., Luxembourg

[21] Appl. No.: 716,728

[22] Filed: Jun. 17, 1991

[30] Foreign Application Priority Data

Jun. 29, 1990 [LU] Luxembourg ............ 87758

[51] Int. Cl.[5] ............ B23P 19/04

[52] U.S. Cl. ............ 29/258; 29/259; 29/253

[58] Field of Search ............ 29/253, 256, 258, 259, 29/263, 265

[56] References Cited

U.S. PATENT DOCUMENTS 1,631,872 11/1925 Knight ............ 29/258
4,724,608 2/1988 Parrott ............ 29/259

*Primary Examiner*—Bruce M. Kisliuk
*Assistant Examiner*—Eileen P. Morgan
*Attorney, Agent, or Firm*—Fishman, Dionne & Cantor

[57] ABSTRACT

The device comprises a gripper with retractable claws which can engage through the tymp and control means which pass through the gripper and can be controlled from outside in order to spread or retract the claws radially with respect to the axis of the tymp. The gripper and its control means are carried by a yoke designed to be fitted onto the outer edge of the tuyere arch and to be associated with a conventional pneumatic explosive-actuated tool which can be fitted to the outside of the yoke, either onto extensions of the claws or onto the control means, in order to exert by its rotation and its bearing on the yoke a tractive force on the claws of the gripper.

20 Claims, 7 Drawing Sheets

DEVICE FOR MOUNTING AND DISMOUNTING SHAFT FURNACE TYMPS

TECHNICAL FIELD

The present invention relates to a device for mounting and dismounting shaft furnace tymps.

BACKGROUND OF THE INVENTION

It is known that shaft furnaces, in particular blast furnaces, are supplied with hot air and with liquid or solid fuels through a circular tuyere fitting in the region of the furnace hearth. These tuyeres are held in place by a tymp accommodated in the interior of the furnace wall, these tymps being extended towards the outside of the wall by a tuyere arch fixed to the outer metal armour of the furnace. The tuyere arches are generally made of steel, while the tymps and the tuyeres are made of copper. The tymps and the tuyeres are, furthermore, water cooled by virtue of a double frustroconical wall.

Whereas the dismounting of a tuyere, which extends beyond the inner side of the furnace wall, generally does not present any particular problems, the dismounting of a tymp is generally a much more difficult operation in view of the fact that the tymp is not only wedged onto the inner seat of the tuyere arch but, in addition, is embedded in the refractory material of the furnace wall, the weight and, if necessary, any relative movement of which it also has to withstand.

The dismounting of a tymp has generally been carried out by a manual service crew, composed of five or six workmen, who try to free the tymp from its seat with the aid of long metal hooks gripping behind the inner edge of the tymp when the tuyere has been disengaged. When the force of manual intervention is insufficient to free the tymp, it is often necessary to resort to a trick consisting of interrupting the circulation of cooling water in the tymp so a to allow it to heat up, due to the heat from the bast furnace wall, beyond the temperature to which it is normally exposed. By suddenly restarting the cooling of the tymp heated up in this way, a thermal shrinkage is produced which may free the tymp from its seat on the tuyere arch. If the fist attempt is not successful, this operation has to be repeated several times, with the risk of seriously damaging the tymp and rendering it unusable, even though it might not necessarily have been considered unusable at the outset. In the extreme case, which occurs more often with reserve tymps than with original tymps, the tymp quite simply has to be gas cut so that it can be disengaged.

There are numerous disadvantages with this mode of operation. Firstly, this work is physically very exhausting for the men of the service crew and, in addition, fairly dangerous. Moreover, many tymps are needlessly damaged, but what is most serious is that the blast furnace remains inoperative for the entire duration of the intervention, which may stretch over several hours.

EP Patent Application No. 90,123,485, corresponding to U.S. Pat. No. 5,127,633, 90,124,485 proposed a device for mounting or dismounting shaft furnace tuyeres or tymps. This is a relatively complex machine provided with a gripper capable of grasping both the tuyere and the tymp and enabling these parts to be freed from their seat without manual force. This gripper is controlled with the aide of a hydraulic unit capable of actuating two telescopic elements of the gripper in opposite directions, as a result of which the hydraulic unit has to be especially designed for this purpose, thereby making the machine relatively complicated and expensive.

SUMMARY OF THE INVENTION

The object of the present invention is to provide a simple device for freeing and dismounting the tymps, which can be actuated by conventional and standard means.

To achieve this objective, the device proposed by the present invention includes a gripper with retractable claws for engaging through the tymp and control means which pass through the gripper and can be controlled from outside in order to spread or retract the claws radially with respect to the axis of the tymp. The gripper and its control means are carried by a yoke designed to be fitted onto the outer edge of the tuyere arch and to be associated with a known pneumatic explosive-actuated tool which can be fitted to the outside of the yoke, either onto extensions of the claws or onto their control means, in order to exert, by its rotation and its bearing on the yoke, a tractive force on the claws of the gripper.

The positional qualifiers "inner" and "outer" used in the present description always refer to blast furnaces, "inner" denoting the inner side of the furnace and "outer" referring to the outer side of the furnace.

The use of the device proposed by the present invention is extremely simple. After removing the elements of the blast connection which direct hot air into the tuyere, the device, preferably mounted on a suitable frame, is moved with the aid of a lift truck so as to be on the same axis as the tymp and is advanced along this axis in order to engage the gripper, in the open position, that is to say with retracted claws, through the tymp until the yoke bears on the circular edge of the tuyere arch and to which it may possible by fixed with the aid of clamping screws. The gripper is then opened with the aid of its control means until the hooks are secured behind the inner edge of the tymp. It is then sufficient to exert, with the aid of a conventional pneumatic explosive-actuated tool, either on the claws or the gripper or on the control rod of the gripper, the tractive force required for freeing the tymp. The advantage is that these explosive-actuated tools are conventional percussion-type explosive-actuated tools which are widely available commercially and the largest models of which are sufficiently powerful to free a tymp with the aid of the device proposed by the invention.

The yoke is perferably a multi-branch yoke having three branches which extend radially from the hub of the yoke at intervals of 120°. The gripper therefore also has three claws associated with the three branches of the yoke and each provided, on the inner side, with a hook which can be secured behind the inner edge of the tymp.

Thus, by virtue of the device proposed by the invention, it is possible to remove the tymps of a blast furnace without great manual effort, and above all, without danger to the service crew. Furthermore, the tymps, freed and removed with the aid of this device, are never damaged during extraction, so that they can be reused provided that they have not been damaged in other ways during use. The device can be controlled easily by two workmen, instead of five to six for a manual intervention. The length of time for the intervention is also reduced to a time which, on the one hand, is practically invariable for removing a tymp and which, on the other hand, is not more than one hour, so that the interruption of the blast furnace production is reduced to a minimum.

The invention also proposes different embodiments for controlling the gripper and the explosive-actuated tool.

According to a first embodiment, the end of each claw opposite the hooks is articulated on a tension device through which passes a threaded rod, accommodated in the corresponding branch of the yoke, without the possibility of axial displacement but with the possibility of rotation under the action of an explosive-actuated tool which can be connected to a polygonal head of the rod.

The means for controlling the gripper have, according to a first embodiment, a wedge consisting of three inclined ramps extending radially from an axial control rod and diverging towards the inner end of the gripper, each ramp comprising means for guiding a cam, which is integral with each of the claws, in order to cause a radial spreading or retraction of the latter depending on the direction of axial displacement of the control rod.

The control rod can consist of two telescopic parts which penetrate into one another by way of internal and external threads respectively, the part carrying the control wedge of the gripper being fixed in terms of rotation and axially displaceable, the other being accommodated in the hub of the yoke so as to be axially immobilized but with the possibility of rotation by virtue of an outer polygonal head which can be actuated by an explosive-actuated tool.

According to another embodiment, the three claws are respectively accommodated between three pairs of lugs which converge in accordance with the conicity of the tymp and are fixed longitudinally to an end plate carried by the inner end of a bushing which is axially displaceable through the hub of the yoke, but locked in terms of rotation with respect to the latter. The claws bear, by way of their end, on the yoke side, on the said end plate of the bushing and are, by way of their opposite inner end, radially spreadable and retractable under the action of an axial displacement of a control rod passing coaxially through the gripper and the bushing, this rod being axially displaceable with respect to the bushing, but locked in terms of rotation with respect to the latter.

The spreading of the three claws can be ensured by three convex spring blades provided on a sleeve fixed to the control rod, while the of the claws counter to the action of the spring blades can be effected by cams provided on this sleeve and associated with oblique ramps on the claws and under the action of an axial driving-in of the control rod inside the tymp. Each claw is then also axially displaceable within the bounds of stops provided on the corresponding lugs.

In this embodiment, the end, opposite the hooks, of each claw can be articulated on an extension passing through the corresponding branch of the yoke and to the threaded end of which an explosive-actuated tool can be connected via a mandrel which can bear on the branch of the yoke.

The gripper can be actuated with the aid of a tubular control sleeve comprising an external thread cooperating, on the outer side of the yoke, with an internal thread of the bushing and an internal thread cooperating with an external thread of the end of the control rod passing axially through the bushing, the external and internal threads of the sleeve being right-handed and left-handed respectively, in order to displace the bushing and the control rod in opposite directions by the same operation. This operation can be effected manually with the aid of a retractable handle engaged on the control sleeve. In order to fit the explosive-actuated tool, in this embodiment, it is possible to provide a mandrel comprising a cylindrical hood engaged around the control sleeve in order to bear on the hub, this mandrel being extended outward by means of a rotary adaptor comprising an internal screw thread in order to be screwed onto the external thread of the control rod of the gripper and a female axial polygonal connector in order to be coupled to the explosive-actuated tool.

In other embodiment, there is provide a tubular control sleeve comprising an external thread cooperating, on the outer side of the yoke, with an internal thread of the hub of the yoke and an internal thread cooperating with an external thread of the bushing in order to displace the latter in the axial direction. These external and internal threads of the sleeve can also be of opposite threading.

In this embodiment, the explosive-actuated tool can be connected to the control rod via a mandrel screwed onto the external thread of the end of the rod and comprising a female axial polygonal connector in order to be coupled to the explosive-actuated tool, the latter, by bearing on the sleeve by way of the mandrel, serving both for opening and closing the gripper, and for extracting the tymp.

In the embodiments in which the control rod is accommodated in a movable bushing of the yoke hub, this rod preferably has a spherical articulation with a limited angular play in order to compensate for any decentering of the device or of the tymp.

Other features and characteristics of the invention will emerge from the description of several advantageous embodiments, given below by way of illustration, with reference to the accompanying drawings.

BRIEF DESCRIPTION OF THE DRAWINGS

FIG. 5(*a*) illustrates the details of the articulation in the control rod.

DETAILED DESCRIPTION OF THE INVENTION

Figure 1:
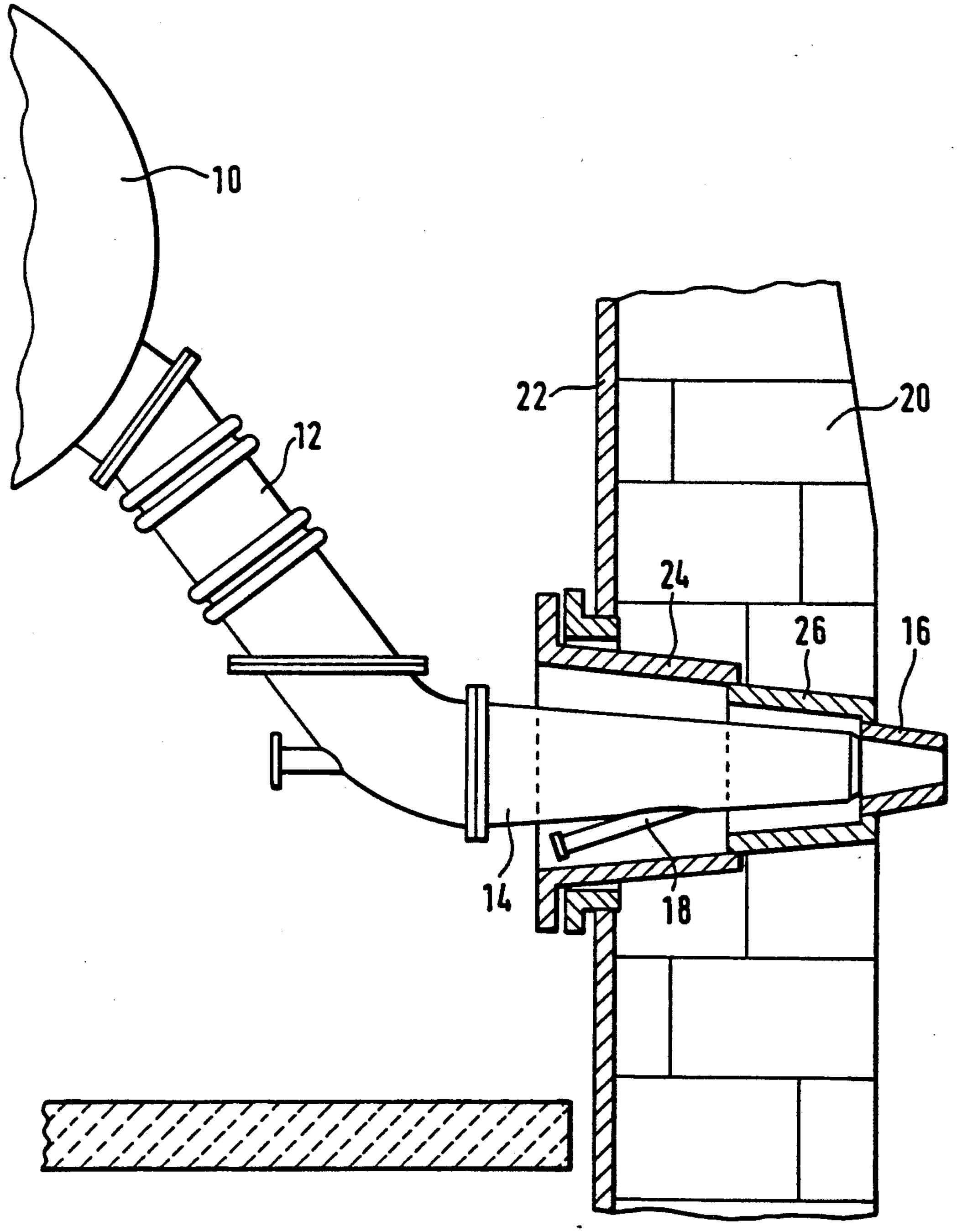
FIG. 1 illustrates diagrammatically a section through a hearth wall of a blast furnace with the opening for accommodating the tymp.

FIG. 1 illustrates diagrammatically the general environment in which the device proposed by the present invention is required to work. The hot air intended to be injected into a shaft furnace is drawn off from a circular pipe 10 passing round the lower part of the furnace and is conveyed through blast connections 12 towards a tuyere fitting 16 in order to be injected into the furnace. The nozzle 14, which additionally have solid or liquid fuel injectors 18, extending through an opening made in the furnace wall 20 and its metal armour 22. This opening is defined in the wall 20, from the outside inward, by a tuyere arch 24 made of steel and a tymp 26 made of copper, the tuyere 16, likewise made of copper, extending the tymp 26. The nozzle 14 bears on a front, generally spherical, seat with which the tuyere 16 is provided. As shown in the figure, the tuyere arch 24, the tymp 26 and the tuyere 16 all have a frustroconical shape and are nested telescopically in one another.

All of these elements depicted in FIG. 1 can be exchanged fairly easily apart from the tymp 26, which is much more difficult to extract essentially because of the seizure between the cooled seat of the tymp 26 and the uncooled seat of the tuyere arch 24.

Figure 2:
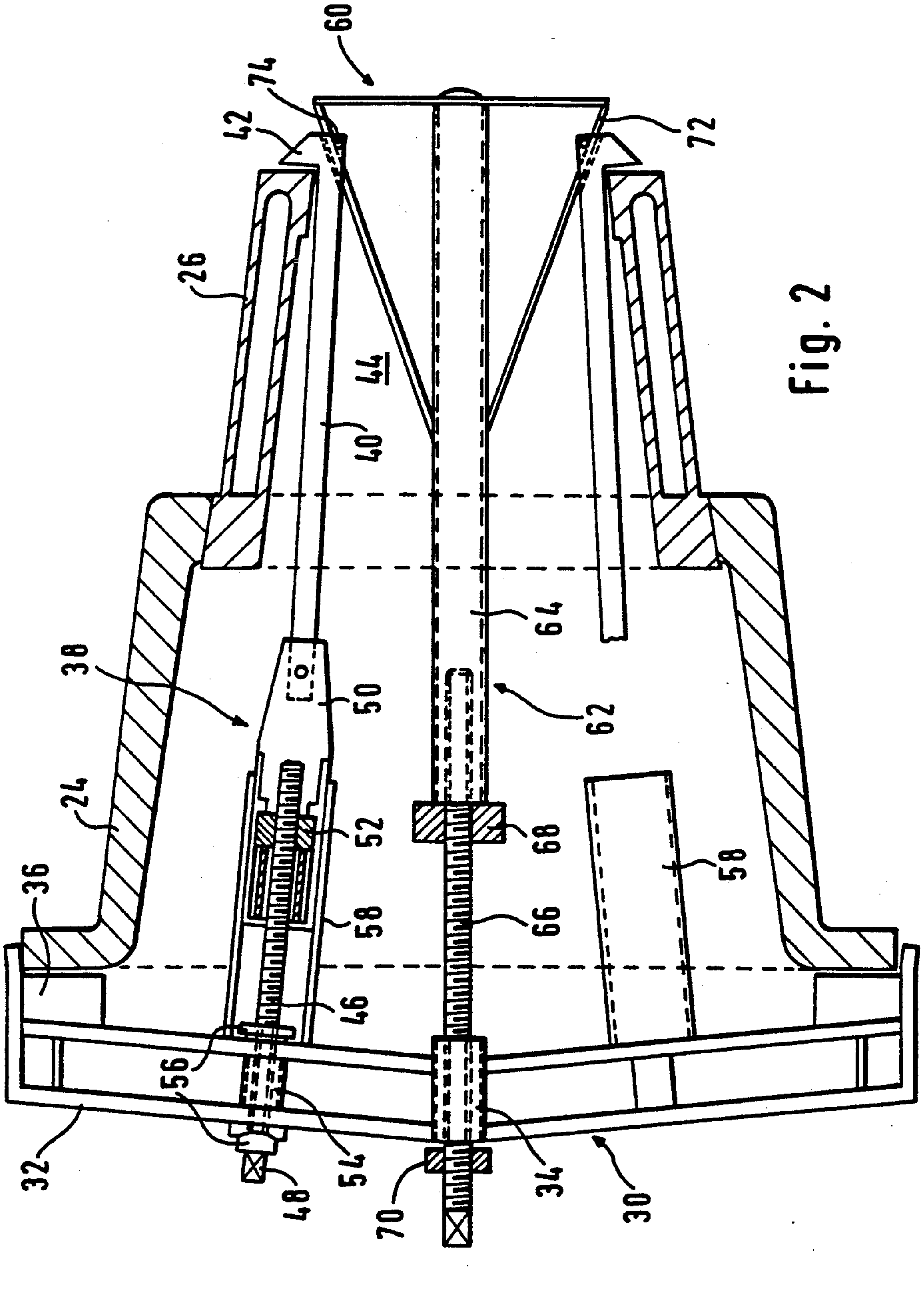
FIG. 2 shows a diagrammatic longitudinal axial section through a first embodiment of the device according to the present invention.

FIG. 2 shows the most simplified version of a device for extracting the tymp 26. The figure illustrates this device in the operative position for extraction, after prior disengagement of the tuyere.

Figure 4:
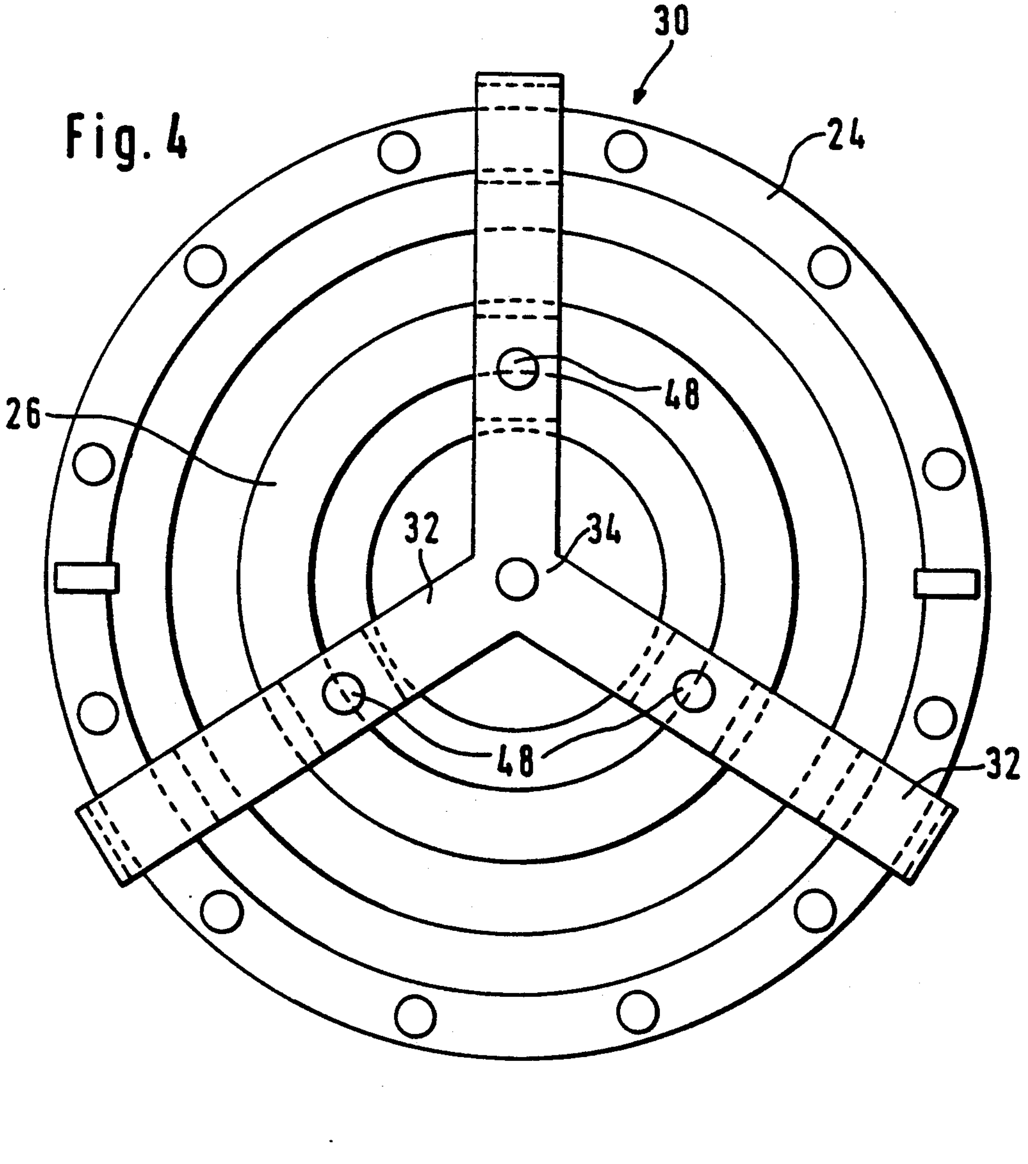
FIG. 4 is a front view of the yoke after its installation on the tuyere arch.

The device shown in FIG. 2 comprises three essential parts, namely a multi-branch yoke 30 as support for the functional elements, which are a gripper and the means for controlling the latter. As shown in FIG. 4, the yoke 30 consists simply of three branches 32 extending radially from the hub 34 and forming equal angles of 120° between them. As shown in FIG. 2, the ends of the branches 32 can be provided, on their inner face, with shoes 36 in order to bear on the circular edge of the tuyere arch 24.

The branches 32 can also have means enabling the yoke to be fixed to the edge of the tuyere arch 24. Furthermore, the branches 32 can be extensive in order to be able to be fitted to tuyere arches of different diameter.

Figure 3:
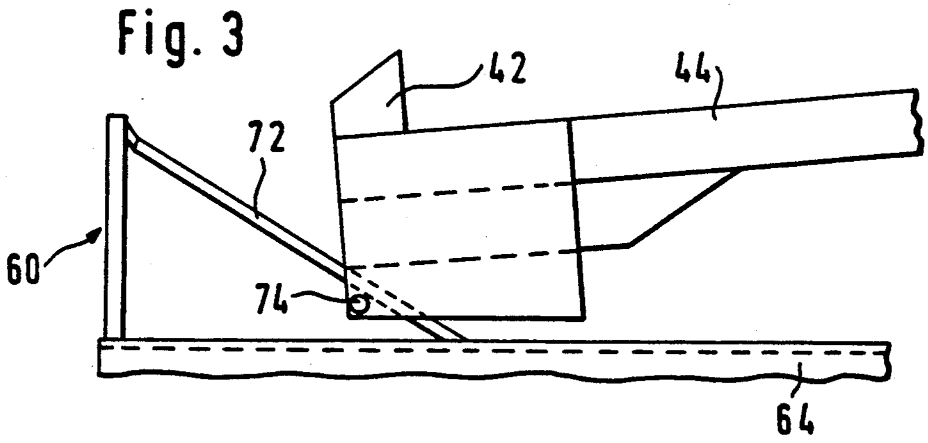
FIG. 3 illustrates diagrammatically the details of the device for controlling the gripper.

As illustrated in FIG. 3, the embodiment of FIG. 2 essentially has three linkages, only one of which is shown at 38. The latter each comprise an inner part formed by a rod 40 terminating in a hook 42, the three rods 40 in fact constituting the claws and a gripper 44. The outer part of the links 38 is essentially formed by a traction screw 46 terminating on the outside of the yoke 30 in a square head 48 which permits the rotation of the traction screw 46. The connection between the traction screw 46 and the claw 40 is constituted in the form of a tension device 50 joined to the claw 40 by an articulation. The tension device 50 has a nut 52 with a counter thread through which the traction screw 46 passes. The unthreaded part of the screw 46 is accommodated in a bushing 54 of a branch 32 of the yoke 30. The axial position of this screw 46 is immobilized in the bushing 54 by outer and inner stops 56. In this way, the distance between the hook 42 and the yoke 30 can be modified by simply rotating the screw 46, preferably under the action of pneumatic explosive-actuated tool engaged on the square head 48 of the traction screw 46. In order to prevent undesired lateral stresses from being exerted on the tension devices 50 and in order to ensure a certain guidance of the latter during their translation, as well as for reasons of safety, each tension device 50 is preferably accommodated in a protective case 58 fastened to the branch 32 of the yoke 30.

The opening and the closure of the gripper 44 are effected with the aid of a device consisting of a control wedge 60 carried by an axial control rod 62. This control rod 62 consists of two interpenetrable telescopic parts, namely a hollow rod 64 and a threaded rod 66 which is accommodated axially in the hub 34 of the yoke 30 and the inner threaded part of which cooperates with a corresponding internal thread of the hollow rod 64, or more simply with a counternut 68 welded to the end of a hollow rod 64. The other end of the threaded rod 66 possesses, like the traction screws 46, on the other side of the yoke 30, a square head and, similarly, is immobilized axially in the yoke 30 by stops 70. Consequently, a rotation of the rod 66 causes an axial displacement of the hollow rod 64 in one direction or the other depending on the direction of rotation. Of course, the functions of the rods 64 and 66 can be reversed, that is to say that the rod 64 is solid and penetrates into the hollow of a rod 66 due to the rotation of the latter. Furthermore, a person skilled in the art will be able to provide other equally simple means to ensure the axial displacement of the part 64 of the control rod 62.

The control wedge 60 can consist (also see FIG. 3), in this simplest version, of three ramps 72 fixed radially to the inner end of the rod 64 and diverging from the latter towards each of the claws 40, in order to form a general configuration in the form of a tripod. Each of the hooks 42 is provided, in its inner corner, with a finger or a cam 74 which is guided along the inner edge of the corresponding ramp 72.

When the control wedge 60 is displaced toward the right in FIG. 2 under the action of a rotation of the head 68 of the control rod, the cams 74 come closer together, through sliding along the inner edges of the ramps 72 of the rod 64, and cause the simultaneous retraction of the claws 40, that is to say the opening of the gripper 44. Conversely, when the control wedge 60 is displaced axially towards the left in FIG. 2, the outer edges of the ramps 72 move the claws 40 away from the control rod 64 in order to close their simultaneous spreading and the closure of the gripper 44.

The maximum diameter of the control wedge 60 must, of course, be less than the smallest section of the tymp 26 in order to permit the installation of the device. After introducing the device into the tymp, with the gripper 44 open, the wedge 60 is displaced axially towards the left in FIG. 2 so as to close the gripper 44 an to secure the hooks 42 firmly behind the inner edge of the tymp 26. This operation is carried out by rotating the head of the rod 66 either manually or with the aid of a pneumatic explosive-actuated tool engaged on this head 68. After the closure of the gripper 44, the pneumatic explosive-actuated tool is engaged successively on the heads 48 of each of the traction screws 46 until the tymp 26 is freed by traction on the individual claws 40. After freeing the tymp 26, the latter can be removed with the device through the tuyere arch 24.

Figure 8:
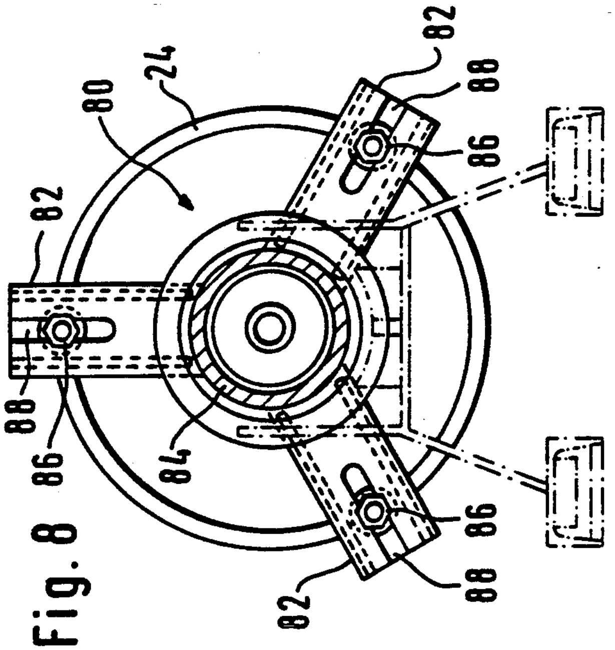
FIG. 8 illustrates a front view of the yoke.

A description will now be given with reference to the following figures of a few more advanced embodiments of the device proposed by the present invention and for which the same reference numerals will be used to designate identical elements All these embodiments likewise make use of a support yoke 80 (see FIG. 8) intended to be applied or fixed to the outer edge of the tuyere arch 24 and carried, depending on the embodiment, by a suitable frame. The yoke 80 likewise has three branches 82 extending radially from the hub 84 of the yoke 80. The ends of the branches 82 are provided with anchoring bolts 86 enabling the yoke to be anchored on the edge of the tuyere arch 24. These anchoring bolts 86 are preferably displaceable in radial grooves 88 of the branches 82 in order to compensate for any deformations of the tuyere arch or to be fitted to tuyere arches of different sizes.

Figure 5:
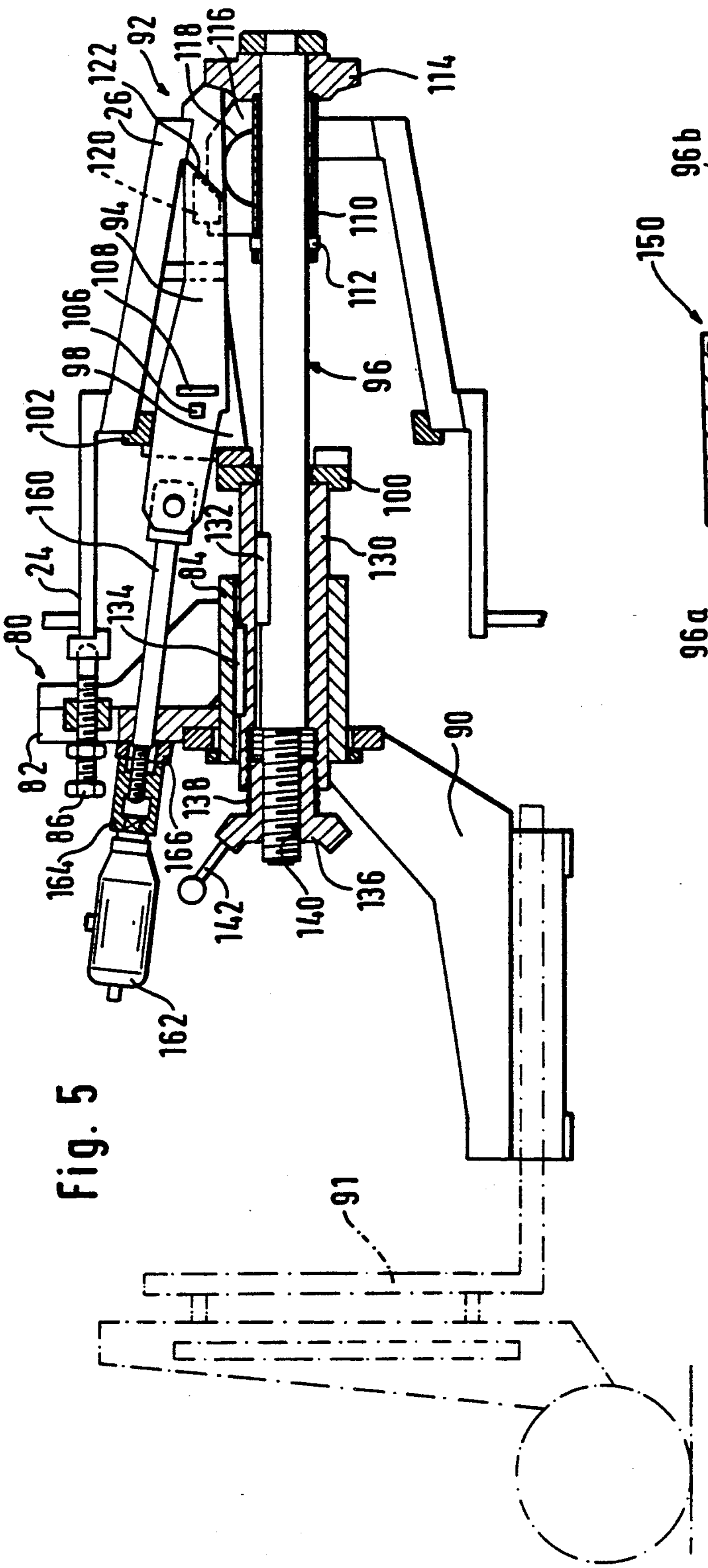
FIG. 5 shows diagrammatically a longitudinal section of a second embodiment.
Figure 5A:
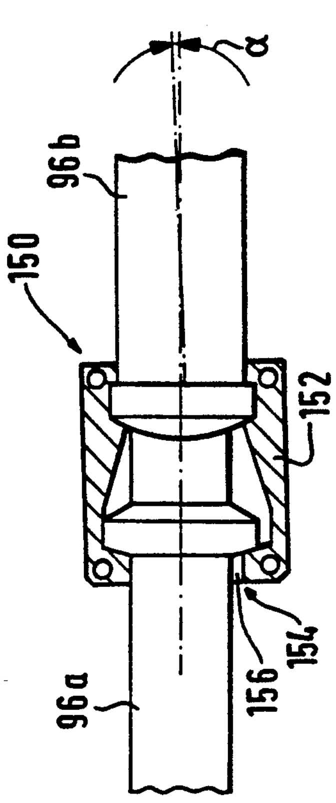

FIG. 5 illustrates a first embodiment installed on the tuyere arch 24 and supported on a frame 90 transportable with the aid of a fork-lift 91. The invention advocates, for the embodiment of FIG. 5 and for those of the following figures, a more advanced gripper 92 of the type described in European Patent Application No. 90124485. In view of the fact that this gripper is described in detail in the above mentioned document, it will only be described briefly in the context of the present application, the reader being invited to refer to the above mentioned document for further details.

The gripper 92 thus has three claws 94 equipped with an inner hook and positioned around an axial control rod 96, opposite the branches 82 of the yoke 80. In the figures, only one of the three claws 94 is shown. Each of the claws 94 is accommodated inside a pair of lugs, only one of which is shown at 98 in the figures. These lugs 98, of substantially triangular shape, converge longitudinally in accordance with the conicity of the tymp 26 are fixed to a diametral end plate 100. The claws 94 bear, between the adjacent lugs 98, by way of their outer part, on the peripheral edge of the end plate 100. The six lugs 98 are also fastened to a circular collar 102 intended to bear on the outer edge of the tymp 26.

In the open position of the gripper 92 (see FIG. 7), the claws 94 have a certain freedom of axial movement limited, on the one hand, by a shoulder 104 facing the end plate 100 and, on the other hand, by stops 106, 108 provided on the claws 94 and the adjacent lugs 98 respectively.

The inner part of the control rod 96 is surrounded by a coaxial cylindrical sleeve 110 held in place, on one side, by a flange 112 of the rod 96 and, on the opposite side, at the end of the rod 96 by a radial end plate 114 fixed to this rod. The sleeve 110 carries three pairs of radial flanks 116, only one of the latter being shown in the figures, the positions of which correspond to those of the lugs 98 and which flank the inner part of each of the claws 94. Located in each of the three spaces defined by each pair of flanks 116, the axial edge of the claws 94, the sleeve 110 and also the flange 112, and the end plate 114 is a floating spring blade 118, the elasticity of which tends to render it convex as shown in FIG. 5. Located on each of the flanks 116 is, furthermore, an oblique cam 120 intended to cooperate with an oblique ramp 122 provided on each lateral side of the claws 94 and formed by an enlargement of the inner end of the latter.

Figure 6:
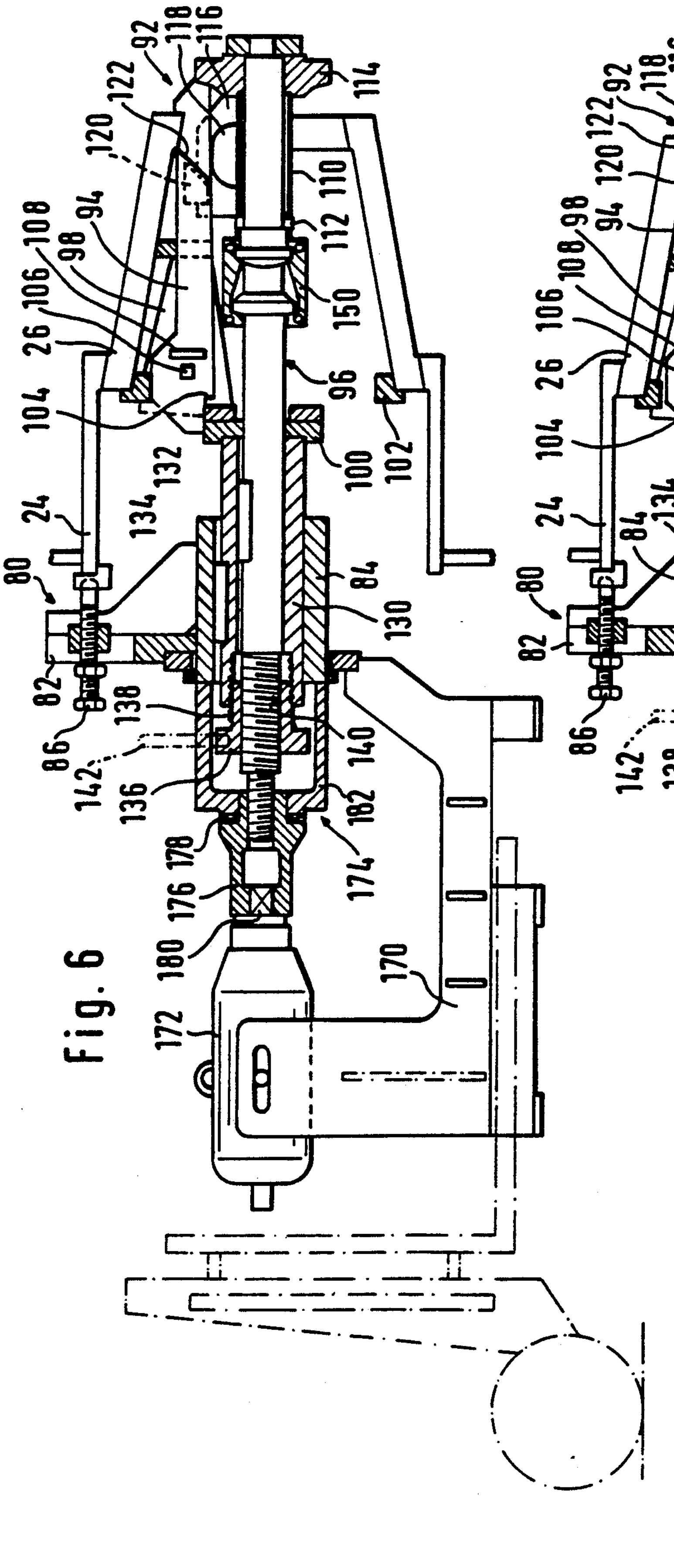
FIG. 6 shows diagrammatically a longitudinal section of a third embodiment.
Figure 7:
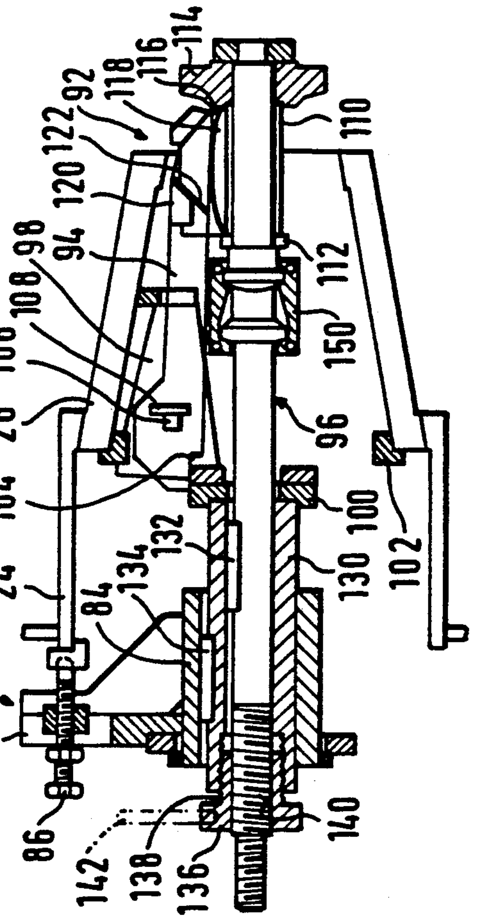
FIG. 7 illustrates details of the gripper.

FIGS. 5 and 6 illustrate the gripper 92 in the fully closed position, the tymp 26 being wedged between the collar 102, on the one hand, and each of the hooks of the claws 94, on the other hand. In order to release the tymp 26 from the close position, the control rod 96 is displaced axially, in one of the ways explained in greater detail below, towards the right in the figures, the end plate 100 with its collar 102 and the lugs 98 remaining in place. By virtue of this movement, the inner end of the claws 94 is first released from the grasp o the end plate 114, while the cams 120 come closer to the ramps 122 of each of the claws. From the moment when the cams 120 come into contact with the ramps 122, the claws 94, by virtue of a certain axial and radial freedom, are likewise carried along toward the right in the figures, under the effect of the thrust of the cams 120, until their axial movement is arrested upon the mutual contact of the stops 106 and 108. By virtue of this axial translation, the claws 94 are disengaged from the inner face of the tymp 26. The continuation of the axial movement of the control rod 96 toward the right in the figures make the cams 120 act on the inclined ramps 122 in view of the fact that the claws are not blocked by the stops 108. This causes, as illustrated in FIG. 7, the radial retraction of each of the claws 94 counter to the action of the spring blades 118 which are flattened and held back due to the force of the arms 120 of the inclined ramps 122. When the claws 94 are completely retracted and occupy the position of FIG. 7, the tymp 26 is totally released from the gripper 92 and the latter can be displaced freely through the tymp, either to be installed or to be removed.

The closure of the gripper 92 comprises the same sequences in reverse over. To this end, the control rod 96 is displaced toward the left from the position of FIG. 7. This movement causes the disengagement of the cams 120 from the inclined ramps 122 of the claws 94 in order to release the latter upon the action of the spring blades 118. The elastic deformation of these blades 118 towards the positions of FIGS. 5 and 6 and the continuation of the movement of the control rod toward the left causes a sliding of the claws 94 under the action of the end plate 114 as far as the position of FIGS. 5 and 6, according to which the gripper is closed and holds tymp 26 between the collar 1202 and the tools of the claws 94.

The embodiments of FIGS. 5 and 6 are the same as regards the axial control of the rod 96. This rod 96 passes coaxially rough a cylindrical bushing 130 which carries at its inner end the end plate 100. The rod 96 can slide axially with respect to the bushing 130 but is immobilized in terms of rotation with respect to the latter by virtue of a key 132. The bushing 130, for its part, is accommodated in the hub 84 of the yoke 80 so as to be able to slide therein in the axial direction, while at the same time being blocked in the rotary direction by virtue of another key 134.

The axial displacement of the rod 96 is initiated by virtue of a tubular control sleeve 136. The latter has an external thread 138 by which it is screwed into a corresponding internal thread of the front part of the bushing 130. The sleeve 136 also has an internal thread 140 which fits a corresponding external thread around the end of the rod 96 emerging from the bushing 130. One of the threads 138 or 140 is right handed, while the other of the threads 140 or 138 is left handed. By virtue of these opposite threads, on turning the sleeve 136 manually with the aid of a retractable handle 142, the counter-reaction on the bushing 130 and the rod 96 induces these two elements to displacement in the opposite direction. However, as a result of the inertia due to a high mass of the bushing 130 and its ring of lugs 98, the said bushing has a tendency to remain immobilized, while the rod 96 is displaced at an axial speed twice as high as that of the control sleeve 136. In other words, if the sleeve 136 is driven a certain distance into the bushing 130, the control rod 96 is displaced, by counter reaction, by a distance twice as great toward the right, as can be seen by comparing FIG. 6 with FIG. 7. Such a movement consequently causes the opening of the gripper. The closure of the gripper 92 is of course effected in the same way by turning the sleeve 136 in the opposite direction.

In view of the fact that, in the embodiments of FIGS. 5 onwards, the control rod 96 is guided in the bushing 130, it does not permit, in contrast to the embodiment of FIG. 2, compensation for this misalignments or irregularities of positioning of the yoke. For this reason, an articulation 150, shown in greater detail in FIGS. 5 (*a*), has been provided in the rod 96. The control rod is in two parts 96(*a*), 96(*b*) which meet along a spherical articulation surface defined by a convex face of one of the parts 96(*b*) and a complementary concave part of the other part 96(*a*) of the rod 96. The stability and the junction of the two parts 96 (*a*) and 96 (*b*) is ensured by a belt 152, an axial opening 154 of which is larger than the corresponding part 96 (*a*) so as to allow an annular play 156 to remain. Depending on the importance of this play 156, one of the parts 96 (*b*) or 96 (*a*) can be subjected, with respect to the other part 96(*a*) or 96(*b*), to a misalignment within a solid angle α. This angular mobility permits the compensation of any irregularity or misalignment o the tymp 26 or of the extraction device and consequently ensures correct positioning of the gripper with respect to the tymp 26.

The two embodiments of FIGS. 5 and 6 are the same as regards the control of the gripper 96. They differ however, as regards the manner of extracting the tymp 26. In the embodiment according to FIG. 5, each of the claws 94 is articulated, on the outer side, on an extension 160 which passes through the corresponding branch 82 of the yoke 80. The end of this extension 160 is provided with a screw thread on which a pneumatic explosive-actuated tool 162 is engaged via a mandrel 164. Under the action of this explosive-actuated tool 162, the mandrel 164 is induced to screw onto the extension 160, but, retained by a bearing surface 166 provided of r this purpose on the branch 82, it exerts a corresponding tractive force on the extension 160 and on the claw 94. The other two claws (not shown) are acted upon successively in the same way until the tymp 26 is released, which is made possible by axial sliding of the bushing 130 in the hub 84 under the thrust of the tymp 26 on the collar 102. Once the tymp 26 has been unwedged, the complete device, including the tymp 26 held in the closed gripper 92, can be extracted from the tuyere arch, after releasing the bolts 86 of the yoke 80, by reversing the lift truck on which the frame 90 is located.

In the embodiment of FIG. 6, the tymp 26 is freed from its seat on the tuyere arch 24 by acting on the control arm 96. In this embodiment according to FIG. 6, a slightly modified support frame 170 is used which permits the installation of a pneumatic explosive-actuated tool 172 in axial alignment on the control rod 96. This explosive-actuated tool 172 is likewise a conventional explosive-actuated tool which is commercially available and sufficiently powerful for the requirements in questions. It can be connected to the end of the control arm 96 via a mandrel 174 after lifting the handle 142. This mandrel 174 has a cylindrical hood 182 which can be engaged around the sleeve 136 in order to bear on the hub 84 of the yoke 80. The mandrel 174 also has a rotary adapter 176 joined to the hood 182 via a rolling bearing 178. The adapter 176 has, in the hollow of the hold 182, an axial opening with a screw thread designed to be screwed onto the threaded end of the control rod 96. A polygonal female connector 180 permits connection to the explosive-actuate tool 172.

When the explosive-actuated tool 172 is put into operation, the rotation of the adapter 176 exerts, by the mandrel 173 bearing on the hub 84 and on account of the fact that the rod 96 cannot turn, a traction on this same rod 96 by driving its end into the mandrel 174. This traction is transmitted via the end plate 114 and the claws 94 to the inner edge of the tymp 26 until the latter is freed from its seat on the tuyere arch. This embodiment of FIG. 6 consequently has, compared with that of FIG. 5, the advantage that the explosive-actuated tool does not have to be applied at three different locations and that it is held during its operation, by the frame 170.

Figure 9:
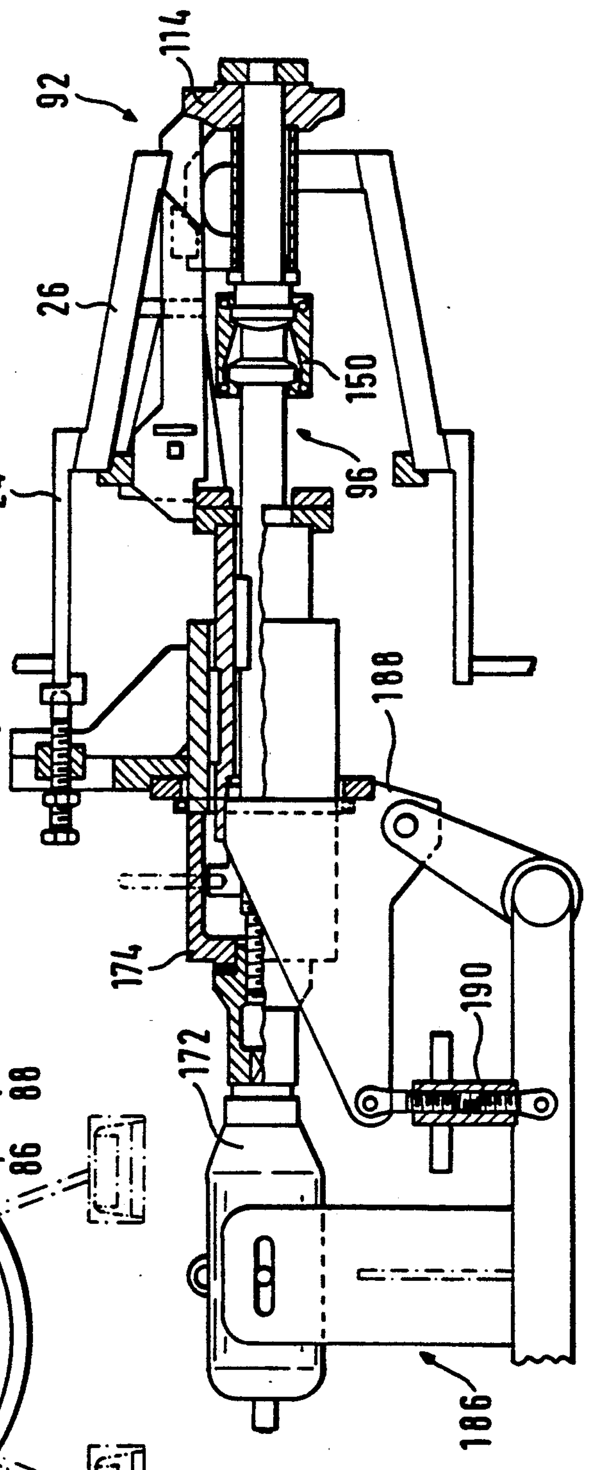
FIG. 9 illustrates a variant of the embodiment of FIG. 6.

FIG. 9 shows a variant of the embodiment of FIG. 6, the frame 170 being replaced by a trolley 186 which runs on rails (not shown) and is suspended below the circular hot blast main which exists around certain blast furnaces in order to support a blast connection dismounting machine. The tymp-extraction device, which is exactly the same as that of FIG. 6, is carried in a cradle 188 mounted on the trolley 186 and the inclination of which is adjustable by means of a double adjusting nut 190.

Figure 10:
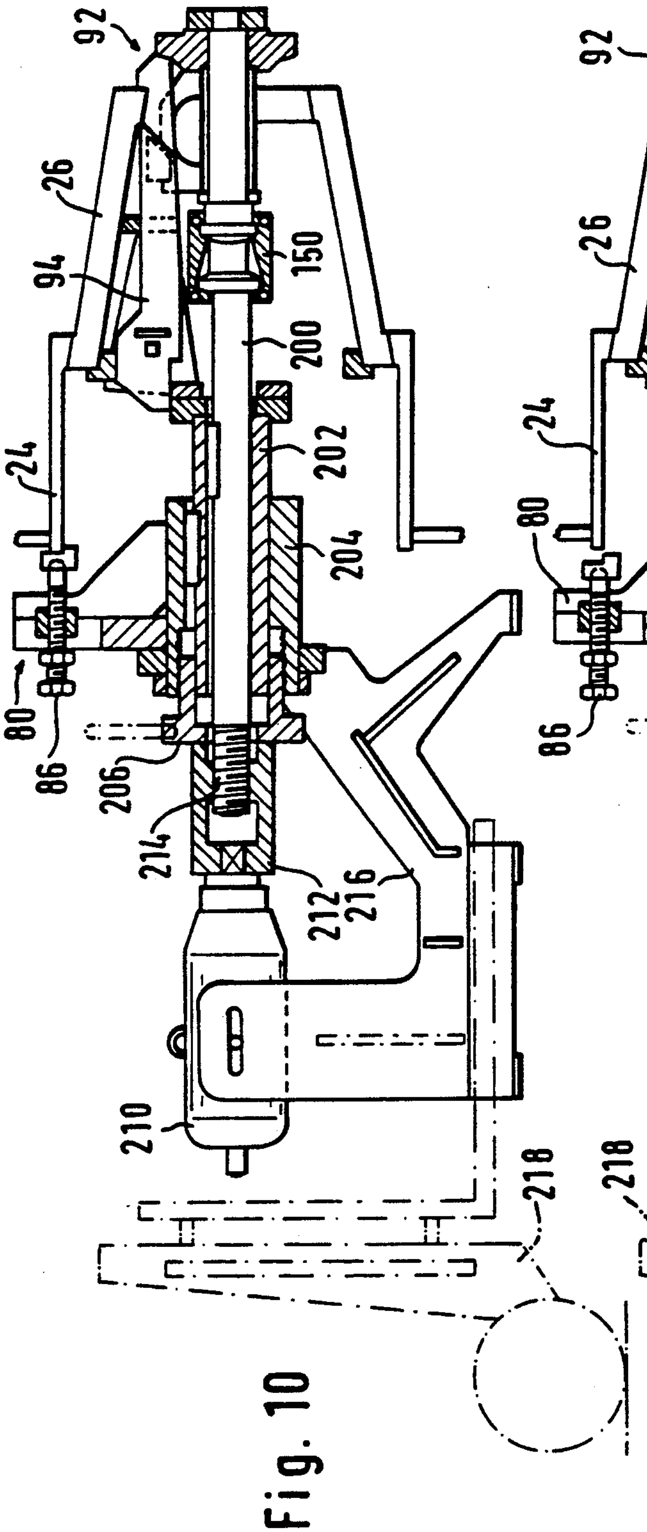
FIGS. 10 and 11 illustrate a longitudinal section of a fourth embodiment of a device according to the present invention, with the gripper closed and the gripper open respectively.
Figure 11:
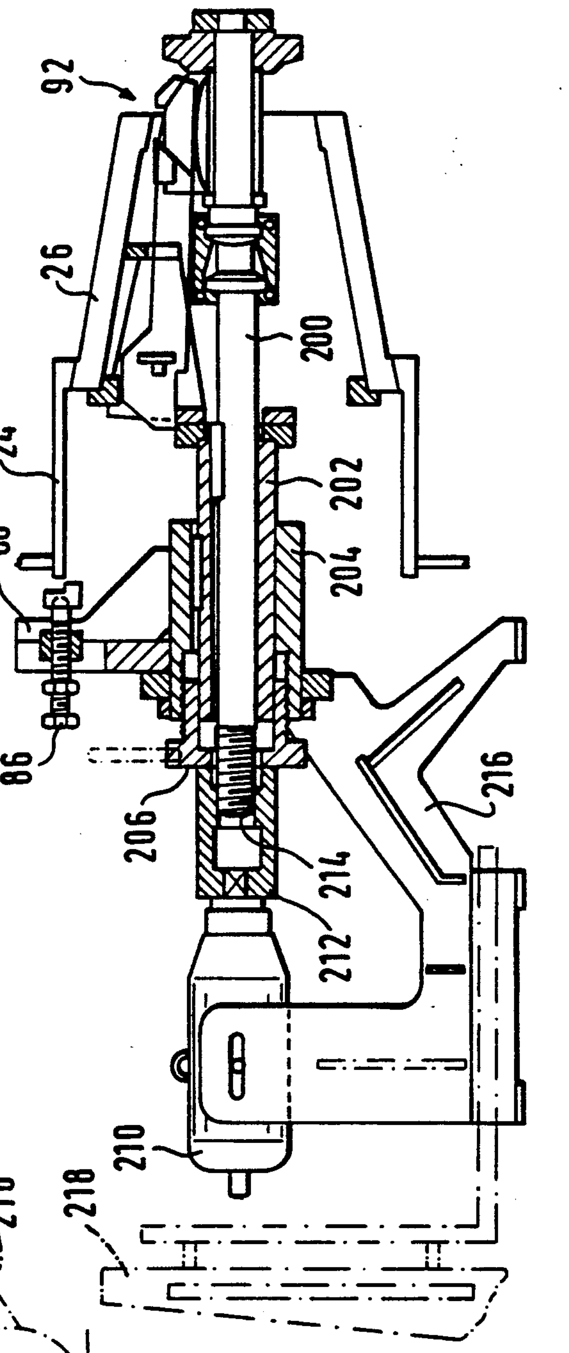

FIGS. 10 and 11 show another embodiment, showing the gripper 92 in the closed position and in the open position respectively. Although the functioning and the constitution of the gripper 92 are identical to the embodiment of FIG. 6, the control of the gripper, in contrast, is different. The opening and closure of the gripper 92 are likewise effected with the aid of a control rod 200 axially displaceable in a bushing 202 which, in turn, is axially displaceable in the hub 204 of the yoke 80. Both the control rod 200 and the bushing 202 are immobilized in terms of rotation with the aid of keys. In contrast to the preceding embodiments, the control sleeve 206 does not act on the control rod 200 which passes freely through a central opening of the sleeve 206. Of course, the latter likewise possesses an internal and external thread, but these cooperate with an external thread of the bushing 202 and an internal thread of the hub 204 respectively. In other words, the control sleeve 206 serves only to displace the bushing 202 axially so as to close the gripper 92 from the rear, by the collar 102 bearing on the outer edge of the tymp 26. The sleeve likewise has opposite external and internal threads so that when the sleeve 206 is screwed into the hub 204, the bushing 202 is subjected to an axial displacement which is twice as great with respect to the hub 204 in the same direction.

In the embodiment of FIGS. 10 and 11, the control rod 200 is directly actuated with the aid of a conventional explosive-actuated tool 210 via a mandrel 212 which possesses an internal screw thread enabling it to be screwed onto a thread 214 at the end of the rod 200 and a polygonal female connector enabling it to be directly fitted onto the explosive-actuated tool 210. The explosive actuated tool and the tymp-extraction device are likewise supported by a frame 216.

In order to dismount a tymp 26, the device is brought into the position of FIG. 11 with the aid of a lift truck 218 until the collar 102 of the gripper 92 is bearing on the outer edge of the tymp 26. The adjusting bolts 86 of the yoke 80 are then tightened onto the explosive-actuated tool 210. The explosive-actuated tool and the tymp-extraction device are likewise supported by a frame 216.

In order to secure the latter on the edge of the tuyere arch 24. The sleeve 206 is then actuated in the direction corresponding to a displacement of the bushing 202 towards the left by a distance of the order of a few millimeters, sufficient to release the outer edge of the tymp 26 from the grasp of the collar 102. The explosive-actuated tool 210 is then actuated in order to turn the mandrel 212 which, by its bearing on the sleeve 206 and its rotation, exerts an axial tractive force on the rod 200. This movement causes the closure of the gripper 92 and, from the closure of the explosive-actuated tool 210 frees the tymp 26 from its seat, under the effect of the traction on the rod 200. The operation is in principle complete when, after freeing the tymp 26, the latter again bears on the collar 102. After releasing the bolts 86 from the yoke 80, the entire device, including the tymp 26 secured in the closed gripper 96, can then be removed.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A device for mounting and dismounting shaft furnace tymps which, when mounted in an operative position, are wedged into an inner circular seat of a tuyere arch in a wall of the furnace, comprising:

gripper means, having a plurality of retractable claws, each of said retractable claws including engaging means for engaging the tymp, said engaging means extending radially outwardly with respect to the longitudinal axis of the tymp;

control means for alternatively spreading or retracting the claws of the gripper means radially with respect to the longitudinal axis of the tymp;

yoke means for mounting the gripper means and the control means thereon and for engaging an outer edge of the tuyere arch; and means for operatively associating the device with an explosive-actuated pneumatic tool for exerting a tractive force on the claws.

2. The device of claim 1, wherein the yoke means comprises a multi-branched yoke having a hub and three branches extending radially from the hub, said branches being circumferentially spaced apart at intervals of 120°.

3. The device of claim 2, wherein the gripper means includes three retractable claws, each associated with one of the three branches; and wherein said engagement means comprises a hook for securing behind an inner edge of the tymp.

4. The device of claim 3, wherein each of the claws extends from a first end to a second end, said second end being provided with the hook and wherein the first end is articulated on a tension device operatively associated with a respective branch of the yoke, said tension device including a rotatably mounted threaded rod for contracting tension device, and said rod having a polygonal end for operatively associating the pneumatic means with the rod.

5. The device of claim 4, wherein each of the tension devices is surrounded by a respective tubular case, each of said respective cases being secured to the corresponding branch of the yoke.

6. The device of claim 1, wherein each of the claws includes a cam, the gripper means includes a housing extending from an inner end to an outer end and wherein the control means comprises:

a control rod, axially bidirectionally displaceable relative to the housing of the gripper means;

a control wedge mounted on the control rod, said wedge including a plurality of inclined ramps extending radially from the control rod and diverging toward the inner end of the housing of the gripper means for guiding the respective cam of each of the respective claws in order to, alternatively, spread or retract the claws according to the direction of axial displacement of the control rod.

7. The device of claim 6, wherein the yoke means includes a hub and a plurality of branches radiating from the hub and wherein the control rod includes an externally threaded first rod element threadably received within an internally threaded second rod element and wherein one of said rod elements is secured to said control wedge and is rotationally fixed but axially displaceable and the other of said rod elements is axially fixedly and rotatably mounted through said hub of said yoke bushing and terminates in a polygonal head for operatively associating explosive actuated pneumatic means with the rod element.

8. The device of claim 2, wherein the tymp has a conical inner surface and the gripper means further comprises:

a tubular bushing axially displaceably and rotationally fixedly mounted through the hub of the yoke; said bushing extending from an outer end, said outer end being disposed outside the yoke, to an inner end;

an end plate secured to the inner end of the bushing;

three pairs of lugs secured to the end plate and converging in correspondence with the conical inner surface of the tymp;

a claw control rod passing coaxially through the bushing and being rotationally fixed but axially displaceable relative to the bushing;

wherein the claws are accommodated between the respective pairs of lugs and each extend from an outer end to an inner end, said outer ends of said claws bearing on the end plate and said inner ends of said claws being radially spreadable and retractable under axial displacement of the claw control rod relative to the bushing.

9. The device of claim 8, said claws further comprising oblique ramped surfaces, said device further comprising:

a sleeve mounted on said control rod;

three convex spring blades, provided on said sleeve for spreading the three claws;

three cams provided on the sleeve for cooperating with the oblique ramped surfaces of the claws to retract the claws against the action of the spring blades upon axially inwardly directed displacement of the control rod.

10. The device of claim 9, further comprising stop means for limiting the axial displacement of the claws.

11. The device of claim 8, wherein the outer end of each claw is articulated on an extension rod passing through the corresponding branch of the yoke, each of said extension rods having an outer threaded end for operatively associating the pneumatic means with the extension rod.

12. The device of claim 8, wherein said outer end of said bushing further comprises an internal thread, said claw control rod includes an externally threaded outer end and said device further comprises a tubular control sleeve passing axially through the bushing, said tubular control sleeve having right-handed external threads for cooperation, on the outer side of the yoke, with the internally threaded outer end of the bushing and having left-handed internal threads for cooperating with the externally threaded end of said claw control rod.

13. The device of claim 12, further comprising retractable handle means for engaging the control sleeve to manually actuate the gripper means.

14. The device of claim 13, further comprising mandrel means for mounting a pneumatic tool, said mandrel means comprising a cylindrical hood for engaging said control sleeve and bearing on said hub of said yoke and rotary adapter means for outwardly extending the mandrel means, said rotary adapter means comprising an internal thread for threadably receiving the externally threaded outer end of the claw control rod and a female axial polygonal connector for operatively associating the mandrel with the pneumatic tool.

15. The device of claim 8, wherein the bushing defines an external thread, the hub defines an internal thread, said device further comprising a tubular control sleeve, said control sleeve including an external thread for cooperating , on the outer side of the yoke, with the internal thread of the hub and including an internal thread for cooperating with the external thread of the bushing in order to axially displace the bushing.

16. The device of claim 15, wherein the external thread and internal thread of the control sleeve are of opposite direction.

17. The device of claim 15, further comprising an explosive-actuated pneumatic tool and mandrel means for operatively connecting the tool with the external thread of the claw control rod, said mandrel means having an internal thread for threadably receiving the external thread of the claw control rod and having a female axial polygonal connector for receiving on output member of the pneumatic tool, and wherein the tool, by bearing on the control sleeve via the mandrel means, serves both for opening and closing the gripper means and for extracting the tymp.

18. The device of claim 8, wherein the claw control rod includes a spherical ariticulation with limited lateral play.

19. The device of claim 8, further comprising frame means for supporting the yoke and an explosive-actuated pneumatic tool, said frame being transportable and manuverable by a fork-lift truck.

20. The device of claim 8, further comprising trolley means for supporting the yoke and an explosive-actuated pneumatic tool.

* * * * *